United States Patent
Schmidt

(10) Patent No.: US 11,379,441 B1
(45) Date of Patent: Jul. 5, 2022

(54) SYSTEM AND METHODS FOR SELF-INPUT INFORMATION VALIDATION AND CORRECTION

(71) Applicant: Capped Out Media, Taylorsville, UT (US)

(72) Inventor: Waynard Schmidt, Taylorsville, UT (US)

(73) Assignee: Capped Out Media, Taylorsville, UT (US)

( * ) Notice: Subject to any disclaimer, the term of this patent is extended or adjusted under 35 U.S.C. 154(b) by 0 days.

(21) Appl. No.: 17/553,906

(22) Filed: Dec. 17, 2021

(51) Int. Cl.
  *G06F 16/00* (2019.01)
  *G06F 16/215* (2019.01)
  *G06F 16/23* (2019.01)
  *G06Q 30/06* (2012.01)

(52) U.S. Cl.
  CPC ........ *G06F 16/215* (2019.01); *G06F 16/2358* (2019.01); *G06Q 30/0601* (2013.01)

(58) Field of Classification Search
  None
  See application file for complete search history.

(56) References Cited

U.S. PATENT DOCUMENTS 10,698,990 B2 * 6/2020 Tsou .............. G06V 40/70

FOREIGN PATENT DOCUMENTS

| CN | 108460266 A | * | 8/2018 | |
|---|---|---|---|---|
| CN | 109598238 A | * | 4/2019 | |
| CN | 114021201 A | * | 2/2022 | |
| JP | 6891356 B1 | * | 6/2021 | ............. G06F 21/31 |

* cited by examiner

*Primary Examiner* — Bai D Vu
(74) *Attorney, Agent, or Firm* — Bochner IP, PLLC; Andrew D. Bochner

(57) ABSTRACT

A computer system for self-input information validation and correction may include receiving, from an electronic device, an input. The input may include information; checking the input against a verification database; if the input matches one set of verified information, tagging the input as verified; if the input does not match, or matches more than, one set of verified information, generating at least one input variation; checking each input variation against the verification database; if an input variation matches one set of verified information, tagging the input as verified, and updating the input on CRM software with a matched input variation; if the input variation does not match one set of verified information, sending a list of input variations to the electronic device; receiving, from a user, a corrected input selection; and updating the input on a CRM software with the corrected input selection.

18 Claims, 3 Drawing Sheets

SYSTEM AND METHODS FOR SELF-INPUT INFORMATION VALIDATION AND CORRECTION

FIELD OF INVENTION

The present invention is in the field of information validation, specifically self-input information validation and correction.

INTRODUCTION

Since the internet began in 1983, internet services have rapidly grown in popularity and many of these services allow customers to order goods from the comfort of their own home, without needing to go outside to a physical store.

An important part of this online experience is ensuring that orders get where they need to go. A customer typically enters various information, such as their address, phone number, and/or email address when checking out. However, there exists a significant problem with customers incorrectly entering their information. For example, a customer may not correctly recall their zip code, or may inadvertently hit an incorrect key on their keyboard. This is especially the case when the customer is using a mobile device where erroneous entries are common due to the small and closely spaced keys on an on-screen keyboard.

Correcting erroneous information can be difficult and poses significant problems to the ecommerce industry, and inefficient information correction systems can harm the store's conversion rate. The conversion rate is the percentage of customers visiting an online storefront which go on to complete a transaction.

When a customer enters an incorrect address, the goods may get returned to the sender. Additionally, the online provider may need to send out a duplicate order to a corrected address in order to fulfill the order. Moreover, attempts to verify and prompt a customer to update their information during checkout can significantly reduce the conversion rate for that online provider.

Existing information validation tools suggest updated information in real time during an online checkout process. However, this substantially reduces conversion rates by creating additional obstacles for the customer before they can complete their transaction, which in turn hurts store revenues.

Accordingly, it is desirable to have a system that allows a customer to complete a transaction, and remedies any erroneous information after the transaction has been completed.

It is further desirable to have a system that detects incorrect customer information after a transaction has been completed, and allows the information to be corrected post-transaction in order to maximize conversion rates and minimize customer inconvenience.

SUMMARY

In an aspect of this disclosure, a computer system for self-input information validation and correction, may include one or more processors, one or more computer-readable memories, one or more displays, one or more computer-readable storage devices, and program instructions stored on at least one of the one or more computer-readable storage devices for execution by at least one of the one or more processors, the stored program instructions may include receiving, from a completed transaction on a user's electronic device, an input. The input may be a type of information. The stored program instructions may further include checking the input against a verification database. The verification database may include at least one set of verified information. The stored program instructions may further include, if the input matches one set of verified information, tagging, via the one or more processors, the input as verified; if the input does not match one set of verified information, or matches more than one set of verified information, generating, via the one or more processors, at least one input variation; checking each input variation against the verification database; if one of the at least one input variations matches one set of verified information, tagging, via the one or more processors, the input as verified, and updating, via the one or more processors, the input on a customer relationship management software with a matched input variation; if one of the at least one input variations does not match one set of verified information, or matches more than one set of verified information, sending a list of input variations to the user's electronic device; displaying the list of input variations on a display of the user's electronic device; receiving, from the user, a corrected input selection; and updating the input on the customer relationship management software with the corrected input selection.

In an embodiment, the input may match a set of verified information if there is a similarity of at least 90% between the input and the set of verified information.

In another embodiment, the input is an address, the address including a company name, a street address, a town/city, a state/county, and a postcode/zoning improvement plan code.

In yet another embodiment, the system may receive, from the user's electronic device, the input at regular intervals. The regular intervals may be 30 minutes in duration. The regular intervals may be based on website traffic, such that an increase in website traffic causes a decrease in interval duration, and a decrease in website traffic causes an increase in interval duration.

In a further embodiment, the computer system for self-input information validation and correction, may further include a machine learning algorithm. The machine learning algorithm may receive at least one matched input and at least one corresponding matched verified information and generate the list of input variations based on the at least one matched input and the at least one corresponding matched verified information.

In an embodiment, the stored program instructions may further include displaying, with the list of input variations, a digital button on the display of the user's electronic device; if the digital button is activated, sending at least one additional input variation to the user's electronic device; and displaying the at least one more input variation on a display of the user's electronic device.

In another embodiment, the stored program instructions may further include receiving, from the user, an order cancellation; upon receiving the order cancellation, not checking the input against the verification database; storing the input; and generating a stored input tagged as cancelled by tagging, via the one or more processors, the input as cancelled.

In yet another embodiment, the stored program instructions may further include checking, via the one or more processors, the input against the stored inputs tagged as cancelled; and, if the input matches more than one stored inputs tagged as cancelled, reporting the information to a website from which the input originated.

In an aspect of this disclosure, a method for validating and correcting self-input information may include receiving, from a completed transaction on a user's electronic device, an input. The input may be a type of information. The method may further include checking the input against a verification database. The verification database may include at least one set of verified information. The method may further include, if the input matches one set of verified information, tagging the input as verified; if the input does not match one set of verified information, or matches more than one set of verified information, generating at least one input variation; checking each input variation against the verification database; if an input variation matches one set of verified information, tagging the input as verified, and updating the input on a customer relationship management software with the matched input variation; if the input variation does not match one set of verified information, or matches more than one set of verified information, sending a list of input variations to the user's electronic device; displaying the list of input variations on a display of the user's electronic device; receiving, from the user, a corrected input selection; and updating the input on the customer relationship management software with the corrected input selection.

In an embodiment, the input may match a set of verified information if there is a similarity of at least 90% between the input and the set of verified information.

In another embodiment, the input may be an address, the address including a company name, a street address, a town/city, a state/county, and a postcode/ZIP code.

In yet another embodiment, the input may be received, from the user's electronic device, at regular intervals. The regular intervals may be 30 minutes in duration. The regular intervals may be based on website traffic, such that an increase in website traffic causes a decrease in interval duration, and a decrease in website traffic causes an increase in interval duration.

In a further embodiment, the method may further include generating, via a machine learning algorithm, the list of input variations. The machine learning algorithm may receive at least one matched input and at least one corresponding matched verified information, and may generate the list of input variations based on the at least one matched input and the at least one corresponding matched verified information.

In an embodiment, the method may further include displaying, with the list of input variations, a digital button on the display of the user's electronic device; if the digital button is activated, sending at least one additional input variation to the user's electronic device; and displaying the at least one more input variation on a display of the user's electronic device.

In another embodiment, the method may further include receiving, from the user, an order cancellation; upon receiving the order cancellation, not checking the input against the verification database; storing the input; and generating a stored input tagged as cancelled by tagging the input as cancelled.

In yet another embodiment, the method may further include checking the input against the stored inputs tagged as cancelled, and, if the input matches more than one stored inputs tagged as cancelled, reporting the information to a website from which the input originated.

Additional aspects related to this disclosure are set forth, in part, in the description which follows, and, in part, will be obvious from the description, or may be learned by practice of this disclosure.

It is to be understood that both the forgoing and the following descriptions are exemplary and explanatory only and are not intended to limit the claimed disclosure or application thereof in any manner whatsoever.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Figure 1:
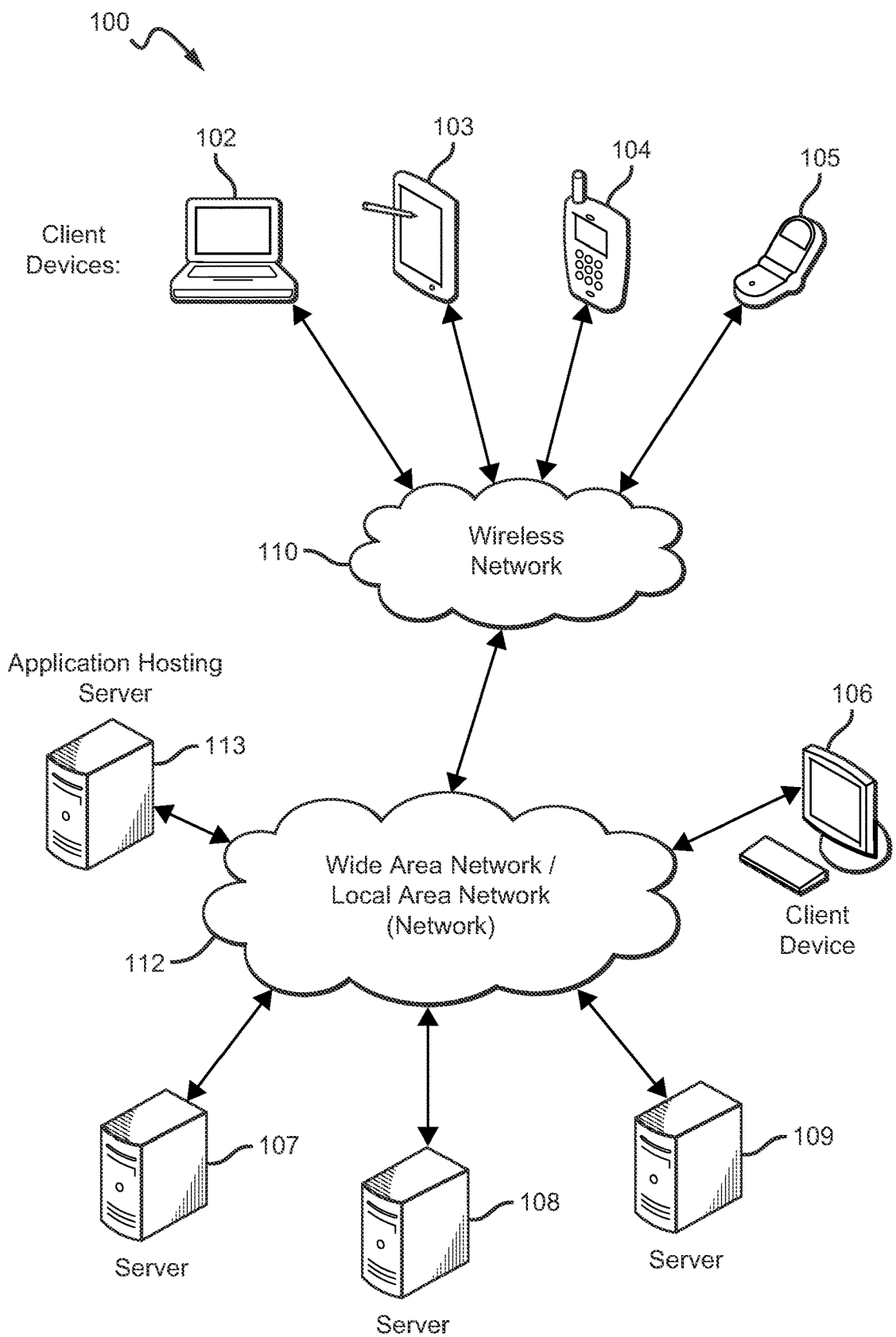
FIG. 1 illustrates a block diagram of a distributed computer system that can implement one or more aspects of an embodiment of the present invention.

FIG. 1 illustrates components of one embodiment of an environment in which the invention may be practiced. Not all of the components may be required to practice the invention, and variations in the arrangement and type of the components may be made without departing from the spirit or scope of the invention. As shown, the system 100 includes one or more Local Area Networks ("LANs")/Wide Area Networks ("WANs") 112, one or more wireless networks 110, one or more wired or wireless client devices 106, mobile or other wireless client devices 102-105, servers 107-109, and may include or communicate with one or more data stores or databases. Various of the client devices 102-106 may include, for example, desktop computers, laptop computers, set top boxes, tablets, cell phones, smart phones, smart speakers, wearable devices (such as the Apple Watch) and the like. Servers 107-109 can include, for example, one or more application servers, content servers, search servers, and the like. FIG. 1 also illustrates application hosting server 113.

Figure 2:
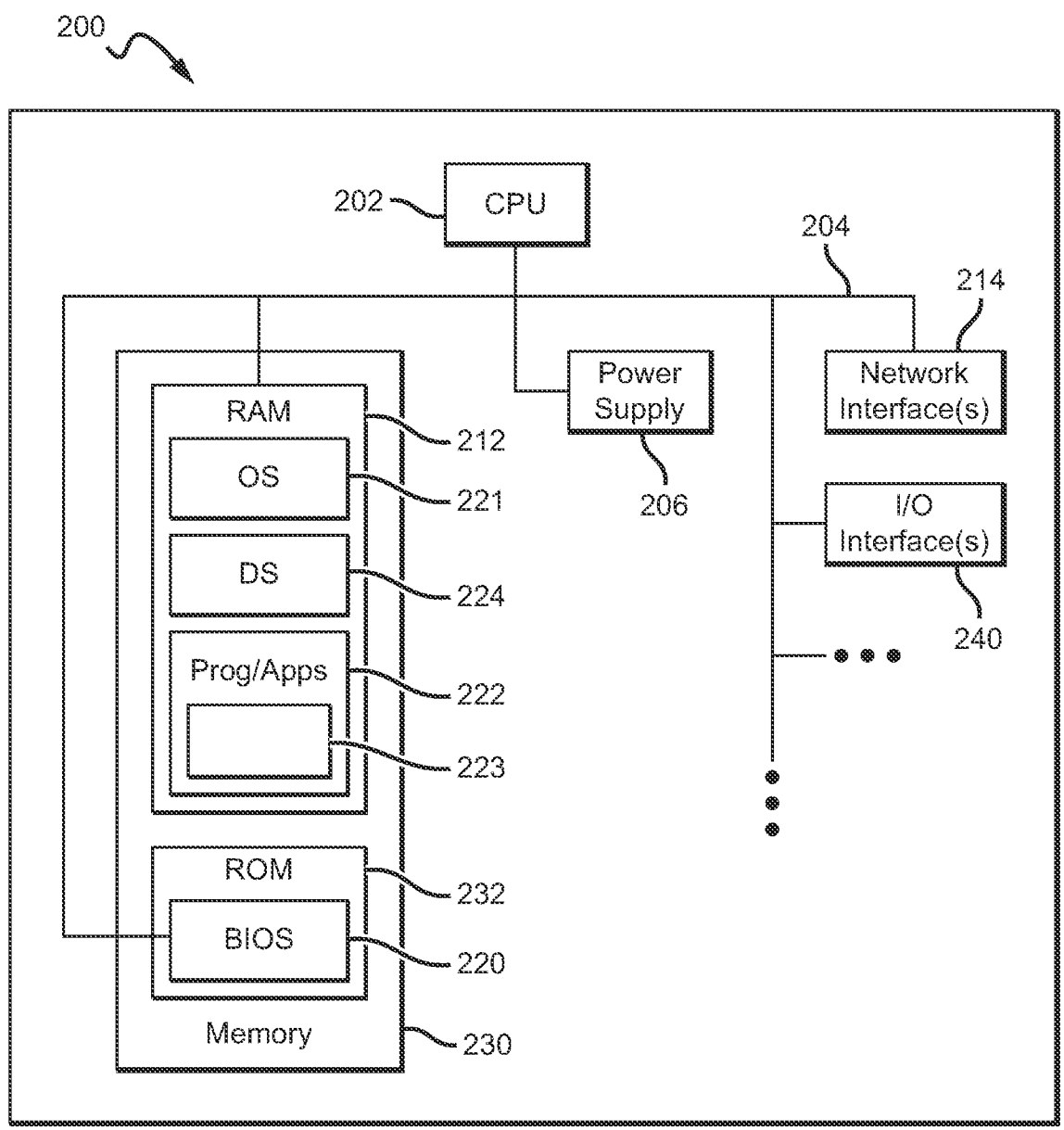
FIG. 2 illustrates a block diagram of an electronic device that can implement one or more aspects of an embodiment of the invention.

FIG. 2 illustrates a block diagram of an electronic device 200 that can implement one or more aspects of an apparatus, system and method for validating and correcting user information (the "Engine") according to one embodiment of the invention. Instances of the electronic device 200 may include servers, e.g., servers 107-109, and client devices, e.g., client devices 102-106. In general, the electronic device 200 can include a processor/CPU 202, memory 230, a power supply 206, and input/output (I/O) components/devices 240, e.g., microphones, speakers, displays, touchscreens, keyboards, mice, keypads, microscopes, GPS components, cameras, heart rate sensors, light sensors, accelerometers, targeted biometric sensors, etc., which may be operable, for example, to provide graphical user interfaces or text user interfaces.

A user may provide input via a touchscreen of an electronic device 200. A touchscreen may determine whether a user is providing input by, for example, determining whether the user is touching the touchscreen with a part of the user's body such as his or her fingers. The electronic device 200 can also include a communications bus 204 that connects the aforementioned elements of the electronic device 200. Network interfaces 214 can include a receiver and a transmitter (or transceiver), and one or more antennas for wireless communications.

The processor 202 can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software-controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software.

The memory 230, which can include Random Access Memory (RAM) 212 and Read Only Memory (ROM) 232, can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system 221, data storage 224, which may include one or more databases, and programs and/or applications 222, which can include, for example, software aspects of the program 223. The ROM 232 can also include Basic Input/Output System (BIOS) 220 of the electronic device.

Software aspects of the program 223 are intended to broadly include or represent all programming, applications, algorithms, models, software and other tools necessary to implement or facilitate methods and systems according to embodiments of the invention. The elements may exist on a single computer or be distributed among multiple computers, servers, devices or entities.

The power supply 206 contains one or more power components, and facilitates supply and management of power to the electronic device 200.

The input/output components, including Input/Output (I/O) interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the Engine, via a network to another device. Also, an application server may, for example, host a web site that can provide a user interface for administration of example aspects of the Engine.

Any computing device capable of sending, receiving, and processing data over a wired and/or a wireless network may act as a server, such as in facilitating aspects of implementations of the Engine. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like.

A server may include, for example, a device that is configured, or includes a configuration, to provide data or content via one or more networks to another device, such as in facilitating aspects of an example apparatus, system and method of the Engine. One or more servers may, for example, be used in hosting a Web site, such as the web site www.microsoft.com. One or more servers may host a variety of sites, such as, for example, business sites, informational sites, social networking sites, educational sites, wikis, financial sites, government sites, personal sites, and the like.

Servers may also, for example, provide a variety of services, such as Web services, third-party services, audio services, video services, email services, HTTP or HTTPS services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for the apparatus, system and method embodying the Engine. Content may include, for example, text, images, audio, video, and the like.

In example aspects of the apparatus, system and method embodying the Engine, client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers such as the Apple Watch and Fitbit, integrated devices combining one or more of the preceding devices, and the like.

Client devices such as client devices 102-106, as may be used in an example apparatus, system and method embodying the Engine, may range widely in terms of capabilities and features. For example, a cell phone, smart phone or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, respiration sensors, body movement sensors, proximity sensors, motion sensors, ambient light sensors, moisture sensors, temperature sensors, compass, barometer, fingerprint sensor, face identification sensor using the camera, pulse sensors, heart rate variability (HRV) sensors, beats per minute (BPM) heart rate sensors, microphones (sound sensors), speakers, GPS or other location-aware capability, and a 2D or 3D touch-sensitive color screen on which both text and graphics may be displayed. In some embodiments multiple client devices may be used to collect a combination of data. For example, a smart phone may be used to collect movement data via an accelerometer and/or gyroscope and a smart watch (such as the Apple Watch) may be used to collect heart rate data. The multiple client devices (such as a smart phone and a smart watch) may be communicatively coupled.

Client devices, such as client devices 102-106, for example, as may be used in an example apparatus, system and method implementing the Engine, may run a variety of operating systems, including personal computer operating systems such as Windows, iOS or Linux, and mobile operating systems such as iOS, Android, Windows Mobile, and the like. Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending and receiving messages via email, SMS, or MMS, playing games (such as fantasy sports leagues), receiving advertising, watching locally stored or streamed video, or participating in social networks.

In example aspects of the apparatus, system and method implementing the Engine, one or more networks, such as networks 110 or 112, for example, may couple servers and client devices with other computing devices, including through wireless network to client devices. A network may be enabled to employ any form of computer readable media for communicating information from one electronic device to another. The computer readable media may be non-transitory. A network may include the Internet in addition to Local Area Networks (LANs), Wide Area Networks (WANs), direct connections, such as through a Universal Serial Bus (USB) port, other forms of computer-readable media (computer-readable memories), or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, optic fiber links, or other communications links known to those skilled in the art.

Furthermore, remote computers and other related electronic devices could be remotely connected to either LANs or WANs via a modem and a telephone link.

A wireless network, such as wireless network 110, as in an example apparatus, system and method implementing the Engine, may couple devices with a network. A wireless network may employ stand-alone ad-hoc networks, mesh networks, Wireless LAN (WLAN) networks, cellular networks, and the like.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, and the like. Access technologies such as 2G, 2.5G, 3G, 4G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like.

Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), Wide Area Networks (WANs), wireless networks, and long-haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

The header of the packet may include, for example, the source port (16 bits), destination port (16 bits), sequence number (32 bits), acknowledgement number (32 bits), data offset (4 bits), reserved (6 bits), checksum (16 bits), urgent pointer (16 bits), options (variable number of bits in multiple of 8 bits in length), padding (may be composed of all zeros and includes a number of bits such that the header ends on a 32 bit boundary). The number of bits for each of the above may also be higher or lower.

A "content delivery network" or "content distribution network" (CDN), as may be used in an example apparatus, system and method implementing the Engine, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's web site infrastructure, in whole or in part, on the third party's behalf.

A Peer-to-Peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Embodiments of the present invention include apparatuses, systems, and methods implementing the Engine. Embodiments of the present invention may be implemented on one or more of client devices 102-106, which are communicatively coupled to servers including servers 107-109. Moreover, client devices 102-106 may be communicatively (wirelessly or wired) coupled to one another. In particular, software aspects of the Engine may be implemented in the program 223. The program 223 may be implemented on one or more client devices 102-106, one or more servers 107-109, and 113, or a combination of one or more client devices 102-106, and one or more servers 107-109 and 113.

In an embodiment, the system may receive, process, generate and/or store time series data. The system may include an application programming interface (API). The API may include an API subsystem. The API subsystem may allow a data source to access data. The API subsystem may allow a third-party data source to send the data. In one example, the third-party data source may send JavaScript Object Notation ("JSON")-encoded object data. In an embodiment, the object data may be encoded as XML-encoded object data, query parameter encoded object data, or byte-encoded object data.

The present disclosure relates to systems and methods for verifying and correcting information entered by a user.

Figure 3:
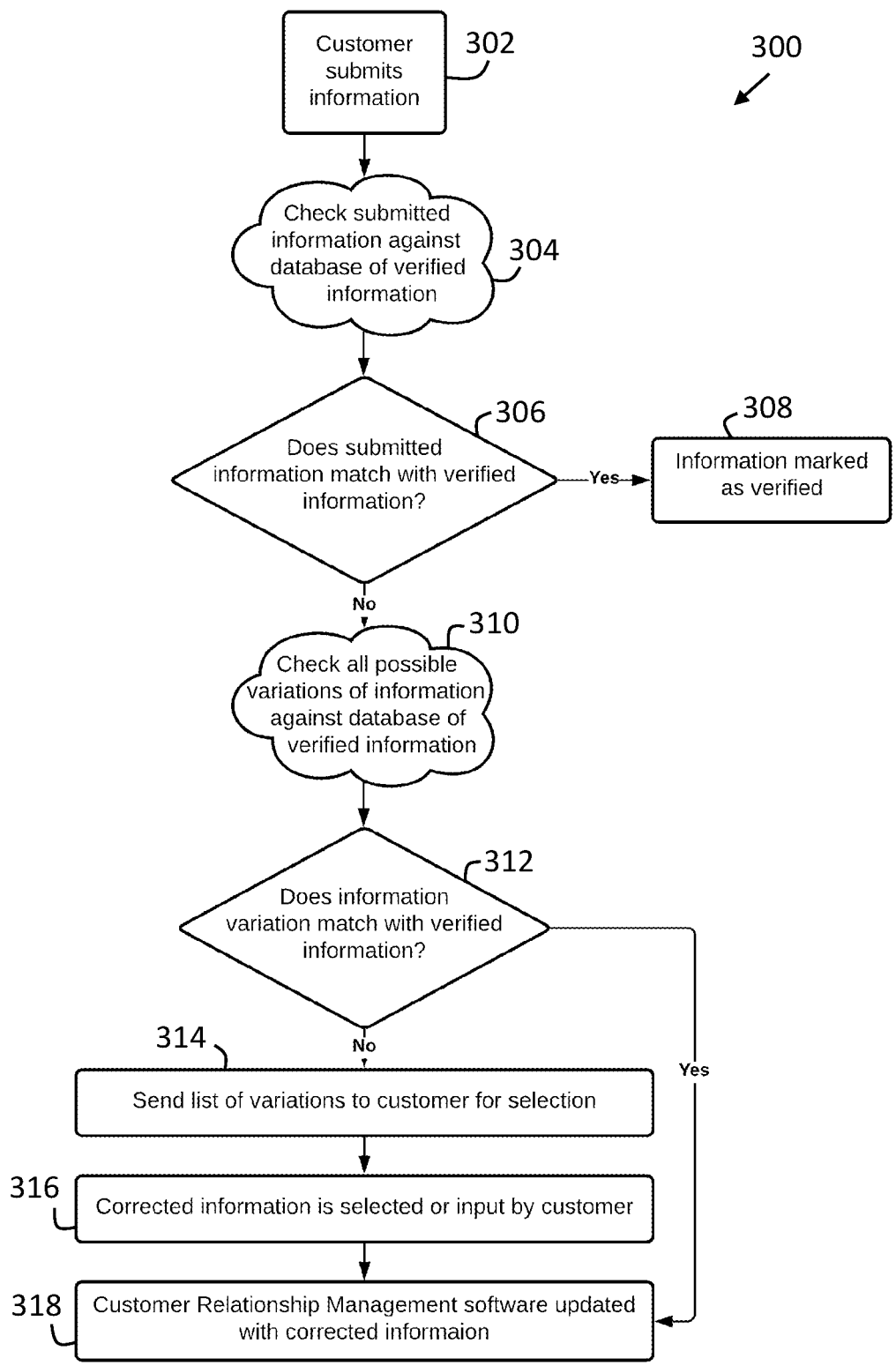
FIG. 3 shows an embodiment of a system for information validation and correction.

Turning to FIG. 3, in an embodiment of the present disclosure a user enters information at 302 from the user's electronic device 200. The user's electronic device 200 may include a desktop computer, laptop computer, smart phone, or wearable device. The user may enter information using a physical keyboard such as a mechanical keyboard. Alternatively, the user may enter information using a digital keyboard. If the user's electronic device 200 is a touchscreen device, the user may enter information by pressing digital keyboard keys displayed on a screen of the electronic device 200 with the user's finger. Alternatively, if the electronic device 200 is not a touchscreen device, the user may enter information by either clicking virtual keyboard keys using a mouse, or by entering the information by pressing keys of a physical keyboard. User information may be entered automatically using an autofill program. An autofill program may store information previously input by the user, and retrieve such information when the program detects a form or spreadsheet.

The user may enter information into a data field of a website or mobile application via the user's electronic device 200. As a non-limiting example, the user may enter information needed to deliver a product to the user such as an address. As an additional non-limiting example, the user may enter information needed to acquire a service such as a video streaming service or other digital media service. Such information may include a first name, and a last name. The user may enter the information into an online checkout. Alternatively, the user may enter the information into any online form or spreadsheet.

Types of information entered by the user may include an address, phone number, first name, last name, email address, credit card number, or combinations thereof. As an example, the user may enter their first name, last name, billing address, shipping address, email, or phone number during the process of completing an online purchase. An address may include a company name, street address, town/city, state/county, or postcode/zoning improvement plan ("ZIP") code. Moreover, a phone number may include a country code, and/or an area code, central office/exchange code, and line/subscriber number.

An online checkout may include several steps in which the user enters information. Once a user initiates checkout, the user may begin by entering billing information, which may include a first name, last name, and/or billing address. Next, the user may enter shipping information, which may include a first name, last name, and/or shipping address. Alternatively, the user may indicate that the shipping information is the same as the billing information. If such an indication is made by the user, the online checkout may import the corresponding information that was entered as the billing information to the shipping information fields. After entering the shipping information, the user may then select the shipping methods. Such shipping methods may include a standard delivery method, an expedited delivery method, or a next-day delivery method.

Once the user has finished entering information, the checkout may display an order preview to the user. The order preview may include information relevant to the order such as order subtotals, taxes applied, delivery fees, or total cost. Additionally, the order preview may also include product details, such as quantity, item name, or short description of the product. In an embodiment, the order preview is displayed to the user toward the end of the checkout process. In another embodiment, the order preview may be displayed to the user throughout the checkout process. In such an embodiment, the order preview may be updated as the user enters information. For example, when the user selects a certain shipping method, the order preview may update to reflect the delivery fee of the selected shipping method. Delivery fees may also be displayed next to each shipping method.

During the checkout process, the checkout may accept any information entered by the user, regardless of information accuracy, which may increase a store's conversion rates by minimizing user input. The user may then submit their information to complete their order. In an embodiment, when the user submits their information to complete their order, the user receives an order confirmation. The information may then be entered into an order database. The information may be entered into the order database via an API. In an embodiment, the information, once submitted, is temporarily stored on a server. The information may be encrypted or not encrypted. In an embodiment, some segments of the information may be encrypted, while other segments of the information are not encrypted. In an embodiment in which the information is temporarily stored on a server, the system 300 may retrieve the information from temporary storage at regular intervals. For example, the system 300 may retrieve the information from the temporary storage once every 30 minutes. However, any suitable time interval may be used. In an embodiment, the time of the regular interval varies based on the source of information. For example, the intervals may be 1 hour for a website which receives a low amount of internet traffic, and 15 minutes for a website which receives a high amount of internet traffic. The regular interval may be actively varied according to the current traffic of a website. As a non-limiting example, the regular interval for a website may be 2 hours during off-peak hours and may decrease to 10 minutes during peak hours. These variable intervals may optimize the computational efficiency of the system 300 by preventing unnecessary information retrievals.

The information may be retrieved via a webhook. A webhook may be a user-defined HTTP callback. The regular intervals at which data is received by the system 300 may be scheduled via a cron command-line utility. In an embodiment, the system 300 retrieves information pertaining to multiple users. Each user's information may be tagged with a user ID. The user ID may be a unique number assigned to each user whose information is entered into the presently disclosed system 300. The user ID may allow a user to be recognized across different websites. Such a feature may allow the system to recognize previously corrected information from the same user. If that user then enters erroneous information, the system 300 at 310 may check to see if the previously corrected information has a degree of similarity with the recently entered erroneous information. As a non-limiting example, the system 300 at 310 may correct the erroneous information to the previously corrected information if they have a match percentage of 50% or higher.

At step 304, after the user has completed their order, information submitted to the order database may be checked by the system 300 against a verification database containing verified information of the same type entered by the user. As a non-limiting example, the verification database may include a list of verified addresses. However, the verification database may include a combination of information types, including addresses, phone numbers, first names, last names, or email addresses. Each type of information may be contained within its own database such that there are multiple verification databases, each including a certain type of information. One or more of these verification databases may be accessed depending on the information entered by the user. As a non-limiting example, if the user only submits an address to the system 300, then the system may only access the verification database containing addresses. In an embodiment, third-party verification databases are used. Such third-party verification databases may include a U.S. postal service ("USPS") database. However, any suitable third-party service may be used.

In an embodiment, the verification database may include previously corrected information from the same user. Such information may have been entered and corrected by the system 300 in a previous transaction. As a non-limiting example, if the information matches the information previously submitted to the system by the user, then the information is automatically corrected to the previously corrected information, and the information is tagged as verified and updated in a Customer Relationship Management ("CRM") software.

In an embodiment, there is one verification database. However, there may be any sufficient number of databases. In an embodiment, different types of information are contained within different verification databases. For example, one verification database may include a list of addresses, while another verification database may contain a list of phone numbers.

At least one verification database may be a local database. The local database may include information which has been corrected in 310 or 316. In an embodiment, this information is stored and used in steps 306 and 312, which are discussed in greater detail below.

The system 300 then determines whether information contained in the order database matches with information in the verification database at 306. If a direct match has been found, the information is given a verified status at 308. If the information does not directly match any information in the verification database, the information is marked as not verified and proceeds to be processed in step 310, which is discussed in more detail below. In such a scenario where there is no direct match, the parts of the information which match are marked as verified, and the parts of the information with no direct match are marked as not verified and proceed to be processed in step 310. In an embodiment, the information will receive a verified status if the information on the order database matches a threshold match percentage of the corresponding information on the verification database. As a non-limiting example, an address may receive a verified status if it directly matches at least 90% of a verified address in the verification database. This threshold percentage may be weighted. In an embodiment, differences in the ZIP code of an address may decrease the match percentage more than differences in the house/unit number of an address. To optimize use of computational resources, the match percentage threshold may vary based on the source of information. As a non-limiting example, the match percentage threshold may be higher for online retail stores. In an embodiment, the system 300 may vary the match percentage threshold based on the percentage of information entries which have a match percentage which is higher than the threshold at 304. For example, if 90% of information entries to a web site have a direct match percentage above the threshold percentage, the system 300 may lower the match percentage threshold.

If information does not sufficiently match information on the verification database, the system 300 may check all possible variations of the information against the verification database at 310. In an embodiment, the system 300 may use machine learning to suggest variations. For example, a user may enter the following address:

1234 80$^{th}$ Aveneue, Sprangfield, ID 12345

Instead of trying random variations of the above address, a machine learning algorithm may produce the following suggestion:

1234 80$^{th}$ Avenue, Springfield, ID 12345

Variations may be suggested depending on related information submitted by the user. For example, a variation of the user's city in their address may be suggested based on the state entered by the user. As an additional example, the system 300 may access public records to produce more accurate suggestions. In such an example, the system 300 may suggest a variation of a phone number based on the user's first name and last name, which is linked to a certain phone number in public records. The machine learning algorithm may improve its suggested variations based on previously successful variations. In an embodiment, the system 300 may produce just one variation of the information at 310. However, the system 300 may produce any number of variations at 310. If part of the information has previously been marked as verified, then the system 300 may suggest variations of the unverified portion of information.

The system 300 may be configured to flag possible instances of fraud. At 304, the system 300 may crosscheck the submitted information with information submitted by other users. The system may flag information as fraudulent if two separate information submissions contain the same credit card information, but different first names, last names, or addresses. If information is marked as fraudulent, an alert may be sent to a user's electronic device 200 or user's bank.

If a variation of the information submitted by the user matches information on the verification database, the user's information is corrected and updated on the CRM software at 318, which is discussed in greater detail below. The CRM software may be integrated into point of sale ("POS") software, or into an inventory management system ("IMS").

If, after testing multiple variables of the information submitted by the user, no direct match is found on the verification database, a list of information variations is sent to the user's electronic device 200 at 314. The system 300 may also send a list of information variations to the user's electronic device 200 if there are no information variations having a match percentage of greater than 90%. In an embodiment, a list of information variations is sent to the user's electronic device 200 if there are multiple variations of user-submitted information which all have direct matches with information in the verification database. The list of information variables may be sent to the user via email, text, phone call, or via a mobile app. The system 300 may send more than one information variation to the user's electronic device 200 at 314. As a non-limiting example, the system 300 may send 4 information variations to the user's electronic device 200. In an embodiment, the number of information variations sent to the user may depend on the quantity of similar information found on the verification database. In another embodiment, the number of information variations sent to the user may depend on the highest match percentage. For example, the system 300 may send a user more information variations at 314 if the highest match percentage is below 50%. However, any suitable number of information variations may be sent to the user's electronic device 200.

To increase the efficiency of the system 300, the system 300 may send a limited number of information variations at 314, and provide a prompt on the user's electronic device to download more variations if needed. The prompt may be in the form of a digital button displayed on a display of the user's electronic device 200. The system 300 may then download, to the user's electronic device 200, at least one more information variation for the user to consider when the digital button is activated.

The information variations being sent to the user's electronic device may be selected based on the match percentage of that information with information contained within the verification database. In an embodiment, 4 information variations having the highest match percentage may be selected to be sent to the user's electronic device 200. In another embodiment, the information variations being sent to the user's electronic device are selected based on suggestions received from a third-party service.

The system 300 may allow for corrected information to be entered from a third-party service. For example, if a user manually updates their information on a third-party service, that service may access the system 300 to log the submitted information and corrected information.

Once the list of information variations is sent to the user's electronic device 200, the user's order may be cancelled if a response is not received within a certain period of time. This period of time may be set by a commercial consumer of the system 300. In an embodiment, the user's order is cancelled if a response is not received within 48 hours of sending the list of information variations to the user's electronic device 200. Alternatively, the period of time may vary based on the cost of the goods being purchased by the user.

Once the information variations are delivered to the user's electronic device 200, the list of information variations are displayed to the user via a display of the user's electronic device 200. Once displayed, the user may select the correct information from the list, or input new information manually at 316. The user may select the correct information by clicking the information via a mouse, or by tapping the correct displayed information if the user's electronic device 200 is a touchscreen device.

Once the user selects the correct information from the displayed list, or manually inputs new information, the corrected information is then submitted to CRM software where that user's previously submitted information is updated with the corrected information. In an embodiment where the user manually inputs new information, the new information is submitted to the system 300 at step 302 to repeat the verification process.

If, at any point between 302 and 310, the user cancels their order, the system 300 may then discard the information relating to that order. In an embodiment, the system 300 may record the relationship between information and cancellations, such that when information is submitted to the system 300, the system 300 retrieves a log relating to that information which indicates how many past cancellations have been associated with the information. The system may report the information to the website from which the information was submitted if a threshold quantity of past cancellations is reached. For example, if a user submits information which has been used in more than one previously cancelled order, the system 300 may report the information to the website where the information originated. The website may then be able to contact the potential customer to address any issues they may have. The system 300 may be configured such that, instead of reporting the information to the web site, commercial consumers of the system 300 may supply messages to be automatically sent to a user's electronic device 200 when the threshold quantity of past cancellations is reached.

As a non-limiting example, the user may engage with a website, online service, or other retail entity. The user may select their desired item and/or service and begin the checkout process. The checkout process may require a user to input personal information, such as an address, name, email, or phone number. Regardless of the accuracy of any personal information, the website, online service, or other retail entity, may confirm the transaction. Confirmation of the transaction may induce a backend inventory system to reduce the quantity of inventory on hand and may begin internal processes, for example, packing, labeling, customer outreach, customer reporting, etc. In tandem, the system 300 may determine whether any of the information is invalid (for example, a misspelled address). The system 300 may then determine the best fit for replacement information according to the methods describe herein. Thus, the system 300 may enable internal processes of a business to continue, while not comprising the potential sale of goods and/or services. If necessary, the system 300 may contact the user at 314, for example, to verify which of the generated information variations is correct. However, the system 300 may be configured to determine the most likely address based on a threshold match percentage, or any other method as described herein.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A computer system for self-input information validation and correction, comprising one or more processors, one or more computer-readable memories, one or more displays, one or more computer-readable storage devices, and program instructions stored on at least one of the one or more computer-readable storage devices for execution by at least one of the one or more processors, the stored program instructions comprising:
   receiving, from a completed transaction on a user's electronic device, an input,
      wherein the input is a type of information;
   checking the input against a verification database,
      wherein the verification database includes at least one set of verified information;
   if the input matches one set of verified information, tagging, via the one or more processors,
   the input as verified;
   generating, via a machine learning algorithm, a list of input variations,
      wherein the machine learning algorithm receives at least one matched input and at least one corresponding matched verified information, and generates the list of input variations based on the at least one matched input and the at least one corresponding matched verified information;
   if the input does not match one set of verified information, or matches more than one set of verified information, generating, via the one or more processors, at least one input variation;
   checking each input variation against the verification database;
   if one of the at least one input variations matches one set of verified information, tagging, via the one or more processors, the input as verified, and updating, via the one or more processors, the input on a customer relationship management software with a matched input variation;
   if one of the at least one input variations does not match one set of verified information, or matches more than one set of verified information,
   sending the list of input variations to the user's electronic device;
   displaying the list of input variations on a display of the user's electronic device;
   receiving, from the user, a corrected input selection; and
   updating the input on the customer relationship management software with the corrected input selection.

2. The computer system for self-input information validation and correction of claim 1, wherein the input matches a set of verified information if there is a similarity of at least 90% between the input and the set of verified information.

3. The computer system for self-input information validation and correction of claim 1, wherein the input is an address, the address including a company name, a street address, a town/city, a state/county, and a postcode/ZIP code.

4. The computer system for self-input information validation and correction of claim 1, wherein the system receives, from the user's electronic device, the input at regular intervals.

5. The computer system for self-input information validation and correction of claim 4, wherein the regular intervals are 30 minutes in duration.

6. The computer system for self-input information validation and correction of claim 4, wherein the regular intervals are based on website traffic, wherein an increase in website traffic causes a decrease in interval duration, and a decrease in website traffic causes an increase in interval duration.

7. The computer system for self-input information validation and correction of claim 1, the stored program instructions further comprising:
   displaying, with the list of input variations, a digital button on the display of the user's electronic device;
   if the digital button is activated, sending at least one additional input variation to the user's electronic device; and
   displaying the at least one more input variation on a display of the user's electronic device.

8. The computer system for self-input information validation and correction of claim 1, the stored program instructions further comprising:
   receiving, from the user, an order cancellation;
   upon receiving the order cancellation, not checking the input against the verification database;
   storing the input; and
   generating a stored input tagged as cancelled by tagging, via the one or more processors, the input as cancelled.

9. The computer system for self-input information validation and correction of claim 8, the stored program instructions further comprising:
   checking, via the one or more processors, the input against the stored inputs tagged as cancelled, and
      wherein, if the input matches more than one stored inputs tagged as cancelled, reporting the information to a website from which the input originated.

10. A method for validating and correcting self-input information, comprising:
   receiving, from a completed transaction on a user's electronic device, an input, and wherein the input is a type of information;
   checking the input against a verification database,
      wherein the verification database includes at least one set of verified information;
   if the input matches one set of verified information, tagging the input as verified;
   generating, via a machine learning algorithm, a list of input variations,
      wherein the machine learning algorithm receives at least one matched input and at least one corresponding matched verified information, and generates the list of input variations based on the at least one matched input and the at least one corresponding matched verified information;
   if the input does not match one set of verified information, or matches more than one set of verified information, generating at least one input variation;
   checking each input variation against the verification database;
   if an input variation matches one set of verified information, tagging the input as verified, and updating the input on a customer relationship management software with the matched input variation;
   if the input variation does not match one set of verified information, or matches more than one set of verified information, sending the list of input variations to the user's electronic device;

displaying the list of input variations on a display of the user's electronic device;

receiving, from the user, a corrected input selection; and updating the input on the customer relationship management software with the corrected input selection.

11. The method for validating and correcting self-input information of claim 10, wherein the input matches a set of verified information if there is a similarity of at least 90% between the input and the set of verified information.

12. The method for validating and correcting self-input information of claim 10, wherein the input is an address, the address including a company name, a street address, a town/city, a state/county, and a postcode/ZIP code.

13. The method for validating and correcting self-input information of claim 10, wherein the input is received, from the user's electronic device, at regular intervals.

14. The method for validating and correcting self-input information of claim 13, wherein the regular intervals are 30 minutes in duration.

15. The method for validating and correcting self-input information of claim 13, wherein the regular intervals are based on website traffic, wherein an increase in website traffic causes a decrease in interval duration, and a decrease in website traffic causes an increase in interval duration.

16. The method for validating and correcting self-input information of claim 10, further including:

displaying, with the list of input variations, a digital button on the display of the user's electronic device;

if the digital button is activated, sending at least one additional input variation to the user's electronic device; and displaying the at least one more input variation on a display of the user's electronic device.

17. The method for validating and correcting self-input information of claim 10, further including:

receiving, from the user, an order cancellation;

upon receiving the order cancellation, not checking the input against the verification database;

storing the input; and generating a stored input tagged as cancelled by tagging the input as cancelled.

18. The method for validating and correcting self-input information of claim 17, further including:

checking the input against the stored inputs tagged as cancelled, and wherein, if the input matches more than one stored inputs tagged as cancelled, reporting the information to a website from which the input originated.

* * * * *